United States Patent Office 3,157,990
Patented Nov. 24, 1964

3,157,990
METHOD OF OPERATING MONOPROPELLANT GAS GENERATORS AND PRECONDITIONING MIXTURE THEREFOR
James J. Ward, Los Angeles, Calif., assignor to The Garrett Corporation, Los Angeles, Calif., a corporation of California
No Drawing. Filed July 2, 1962, Ser. No. 207,101
8 Claims. (Cl. 60—35.4)

This invention relates generally to monopropellant gas generators and particularly to a method of operating monopropellant gas generators with a minimum of carbon adherence to and scaling of the internal generator surfaces. The invention relates also to a monopropellant-additive mixture for preconditioning monopropellant gas generators against carbon adherence and surface scaling.

This application is a continuation-in-part of my copending application Serial No. 822,718, filed June 25, 1959 and entitled Preconditioning of Gas Generators, now abandoned.

As is well known in the art, a monopropellant, such as ethylene oxide, is a metastable fuel which becomes unstable under certain conditions of pressure and temperature. When subjected to these conditions, the monopropellant undergoes exothermic disassociation or decomposition. In the proper environment, such as in the combustion chamber of a monopropellant gas generator, this decomposition becomes self-sustaining so long as the monopropellant is supplied and excessive heat is not extracted from the decomposing monopropellant. If excessive heat is extracted, the self-sustained decomposition of the monopropellant will cease.

In the course of decomposition of a monopropellant, a substantial quantity of carbon is normally formed which adheres to the internal surfaces of the gas generator. This carbon deposition is, of course, highly objectionable since it fouls the generator and adversely affects its operation. While the exact mechanism by which the carbon formation occurs is not definitely known, experiments have tended to substantiate the theory that the carbon formation is caused by a catalytic action between the decomposing monopropellant and the internal metal surfaces of the gas generator.

A further undesirable action which commonly occurs in a monopropellant gas generator is scaling of the internal generator surfaces. This surface scaling results from the intense heat which is generated during the exothermic decomposition of the monopropellant.

A principal object of the present invention is to provide a method of operating a monopropellant gas generator which minimizes carbon adherence to and scaling of the internal generator surfaces.

Another object of the invention is to provide a monopropellant-additive mixture for preconditioning a monopropellant gas generator against carbon adherence and surface scaling.

Other objects, advantages and features of the invention will become readily apparent to those skilled in the art as the description proceeds.

Briefly, the present method of operating a monopropellant gas generator involves initially operating the generator for a short period of time with the preconditioning mixture of the invention and subsequently operating the generator with ethylene oxide alone. This preconditioning mixture comprises ethylene oxide combined with one or more of the additive compounds mentioned below.

It has been found that a monopropellant gas generator which is operated in this way is so-preconditioned during its initial operation on the preconditioning mixture that carbon adherence to and scaling of the internal surfaces of the generator are greatly minimized during subsequent operation of the generator on ethylene oxide alone.

Referring now to the invention in greater detail, there is provided a preconditioning mixture for monopropellant gas generators comprising ethylene oxide combined with one or more additive compounds selected from the group tricresyl phosphate $(CH_3C_6H_4)_3PO_4$ and tributyl phosphate $(C_4H_9)_3PO_4$. While the resulting substance is a mechanical mixture, whereby no chemical reaction occurs which would render critical the relative proportions of ethylene oxide and additive in the mixture, it has been found that the ends of the invention are attained most satisfactorily with a relative proportion of additive to ethylene oxide in the range of 0.2% to 0.5%. An additive percentage of 0.25%, for example, has been found to effectively inhibit carbon deposition and surface scaling. As will be discussed shortly, however, certain factors involved in and unique to the operation of a monopropellant gas generator do limit the percentage range of additives which can be succesfully employed in the invention.

According to the preferred practice of the invention, the first step of the present method of operating a monopropellant gas generator involves preheating the generator reaction chamber in the usual way to a temperature of at least 1070° F. and then injecting the preconditioning mixture into the chamber. At this temperature, the ethylene oxide in the mixture becomes unstable and undergoes exothermic decomposition, thereby increasing the temperature in the chamber to approximately 1800° F. At this latter temperature, the decomposition of the ethylene oxide becomes self-sustaining so long as the ethylene oxide is supplied to the chamber and excessive heat is not extracted from the decomposing ethylene oxide.

The additive or additives in the mixture also undergo decomposition in the reaction chamber under the elevated conditions of heat and pressure created therein by the ethylene oxide. During this decomposition, the additives form a coating, probably a phosphate coating, on the internal generator surfaces. This coating very effectively inhibits carbon decomposition and scaling of these surfaces during subsequent operation of the generator on ethylene oxide alone.

One manner in which it has been found desirable to carry out the present operating method, for example, is preconditioning the generator by operating it twice in succession, for a period of 30 seconds each time, with the present preconditioning mixture and then operating the generator on ethylene oxide alone. According to a modified but successful practice of the invention, the generator is preconditioned by operating it a single time, but for a longer period, with the preconditioning mixture.

It has been found that the present operating method enables a monopropellant gas generator to be operated as many as twenty times, after preconditioning, without excessive carbon deposition or surface scaling.

Obvious advantages of the present operating method are a saving in the cost of the additives used and the elimination of the need for preparing and delivering to the generator a continuous supply of the inhibiting mixture. Another advantage of the present operating method is that both adequate generator protection and maximum generator output are attained. If the generator were continuously operated with the preconditioning mixture, for example, maximum generator output would not be obtained. The reason for this is that some of the thermal energy generated by the ethylene oxide is expended in effecting decomposition of the additives, which decomposition is an endothermic process in the oxygen-bare atmosphere of a monopropellant gas generator reaction chamber. With the present method, adequate generator protection is attained by using the ethylene oxide-additive mixture during the preconditioning run or runs while maximum output is attained by subsequent operation of the generator on the ethylene oxide alone.

In this connection, the use of the present additives in a monopropellant gas generator involves considerations which are not involved in use of similar additives in an internal combustion engine operating on a hydrocarbon fuel. Thus, in an internal combustion engine, the additives undergo exothermic combustion along with the hydrocarbon fuel and thus contribute to, rather than reduce, the power output of the engine. In a monopropellant gas generator, on the other hand, thermal energy is extracted from the decomposing ethylene oxide to cause the endothermic decomposition of the additives. If the energy thus extracted from the ethylene oxide exceeds a certain critical value, self-sustained decomposition of the ethylene oxide will cease. This "quenching" effect of the additives on the self-sustained decomposition of the ethylene oxide, then, sets a maximum limit on the percentage of additives which can be combined with the ethylene oxide to successfully practice the present invention. The minimum percentage of additives which can be successfully employed in the invention is that required to produce an adequate protective coating on the generator surfaces. These factors, then, establish a restricted range of additive proportions essential to the successful practice of the present method of operating a monopropellant gas generator. As mentioned earlier, for example, an additive percentage range of 0.2% to 0.5% has been found to be suitable for attaining the desired ends of the invention.

The exact mechanism by which the present additives achieve or perform their carbon deposition and scaling-inhibiting action is not known. On the basis of experiments which have been conducted in connection with the invention, however, it has been theorized that the coating, probably a phosphate coating, which the additives form on the internal generator surfaces, poisons or inhibits the catalytic, carbon-forming action thought to occur between these surfaces and the decomposing ethylene oxide. At any rate, the present method of operating a monopropellant gas generator and the present gas generator preconditioning mixture have been found to very effectively inhibit both carbon adherence to and scaling of the internal surfaces of a monopropellant gas generator.

While certain preferred embodiments and practices of the invention have been specifically disclosed, it is understood that the invention is not limited thereto, as many variations will be readily apparent to those skilled in the art and the invention is to be given its broadest possible interpretation consistent with the prior art.

I claim:
1. A preconditioning mixture for monopropellant gas generators which consists essentially of ethylene oxide having admixed therein 0.2% to 0.5% of a deposit-inhibiting additive selected from the group consisting of tricresyl phosphate and tributyl phosphate.

2. A preconditioning mixture for monopropellant gas generators which consists essentially of ethylene oxide having admixed therein about 0.25% of tricresyl phosphate.

3. A preconditioning mixture for monopropellant gas generators which consists essentially of ethylene oxide having admixed therein about 0.25% of tributyl phosphate.

4. The method of operating a monopropellant gas generator with a minimum of carbon adherence to the surfaces of said generator which comprises decomposing in said generator a mixture consisting essentially of ethylene oxide having admixed therein 0.2% to 0.5% of a deposit-inhibiting additive selected from the group consisting of tricresyl phosphate and tributyl phosphate, and thereafter operating said generator with ethylene oxide alone.

5. The method of operating a monopropellant gas generator within a minimum of carbon adherence to the surfaces of said generator, which comprises preheating the generator chamber to the decomposition temperature of ethylene oxide, operating said generator for at least about 30 seconds by injecting into said chamber a preconditioning mixture consisting essentially of ethylene oxide having admixed therein 0.2% to 0.5% of a deposit-inhibiting additive selected from the group consisting of tricresyl phosphate and tributyl phosphate, thereby forming a carbon deposit-hinhibiting coating on the internal generator surfaces, and thereafter operating said generator by injecting additive-free ethylene oxide into its chamber.

6. The method according to claim 5 wherein said preconditioning mixture consists essentially of ethylene oxide having about 0.25% tricresyl phosphate admixed therewith.

7. The method according to claim 5 wherein said preconditioning mixture consists essentially of ethylene oxide having about 0.25% tributyl phosphate admixed therewith.

8. The method of operating a monopropellant gas generator with a minimum of adherence of carbon to the surfaces thereof, which comprises preheating the generator chamber to a temperature of at least 1070° F., operating said generator for an interval of about 30 seconds by injecting into said preheated chamber a preconditioning mixture consisting essentially of ethylene oxide having admixed therein about 0.2% to 0.5% of an additive selected from the group consisting of tricresyl phosphate and tributyl phosphate, thereafter cooling said chamber, again reheating said chamber to at least 1070° F., resuming the injection of said preconditioning mixture into said chamber for another interval of about 30 seconds, and then operating said generator by injecting additive-free ethylene oxide into its chamber.

No references cited.